Aug. 29, 1944.   Z. T. WALTER   2,356,902
MEANS FOR AND METHOD OF MOLDING PLASTIC ARTICLES
Filed June 19, 1943
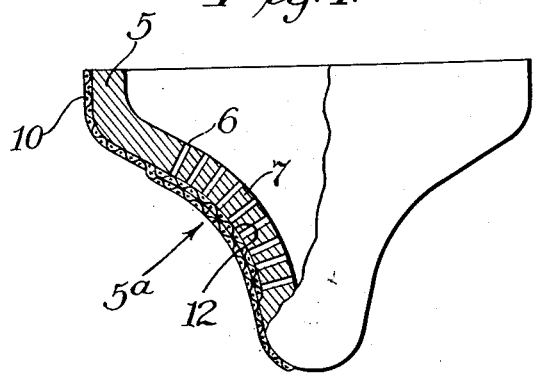
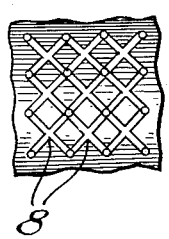
INVENTOR.
Zachary T. Walter,
BY
Atty.

Patented Aug. 29, 1944

2,356,902

UNITED STATES PATENT OFFICE 2,356,902

MEANS FOR AND METHOD OF MOLDING PLASTIC ARTICLES

Zachary T. Walter, Los Angeles, Calif.

Application June 19, 1943, Serial No. 491,530

4 Claims. (Cl. 18—47)

My invention has to do with molds and molding methods. More particularly, it relates to means for and method of molding plastic articles on curved mold surfaces in a manner to prevent the article pulling away from the mold during molding by virtue of tension created by curing of the plastic forming the article and which at the same time will render the finished product readily releasable from the mold.

In the forming of laminated plastic articles, such as boats and the like, on a mold defining the inner surface of the article, using material such as fabric sheets impregnated with a suitable plastic adhesive, for instance, a volatile solution containing ethyl cellulose and solvents therefor, it is difficult to form the laminae about reverse curves for the reason that as the solution volatilizes, the laminae are drawn taut, tending to pull the inner lamina away from the mold. Thus, in order to insure that the article adheres to the curvature of the mold, I find it necessary to cause the inner lamina to adhere with an adhesive force which is relatively greater than the tensioning exerted by the volatilizing of the plastic solution.

It is therefore among the principal objects of my invention to provide a mold and method of molding capable of effectively retaining the plastic laminae in conformance with the mold and which at the same time is capable of being easily released when the product is formed.

Additional advantages are inherent in the invention and how those as well as the above-named objects are attained will be best understood from the following detailed description of one of its embodiments, for which purpose I shall refer to the accompanying drawing in which:

Fig. 1 is an end view, partly in section, of a mold embodying my invention and Fig. 2 is a fragmentary plan view.

Referring to the drawing, I show a mold 5 on which an article such as a boat is being formed, the mold presenting a reversely curved portion 5a. Transversely through the curved portion 5a I provide a plurality of relatively small fluid-passing holes 6 leading from the interior surface to the outer surface 7 of the mold. As best shown in Fig. 2, I provide intercommunication between the discharge ends of the holes 6 by forming cross channels 8 extending between adjacent holes, for the purpose to be described.

Before applying the boat-forming lamina 10 to the mold I cover the reversely curved portion 5a with a sheet of porous fabric 12 impregnated with a water-soluble adhesive which will cause the sheet 12 to adhere to the mold surface 7 and to the lamina 10 with relatively greater tenacity than the tensioning exerted on the lamina 10 by evaporation of the volatiles from the latter. For impregnating the sheet 12 I find a solution of sodium silicate to be preferable, to which solution I may add 2% by volume of gelatine or other equivalent hygroscopic substance, which so plasticizes the sodium silicate as to prevent it from becoming too brittle and losing its adhesive strength. Typically, the sheet 10 is of porous fabric impregnated with a volatile solution containing a thermoplastic such as ethyl cellulose and a solvent therefor and any number of laminae may be used in lieu of the single sheet illustrated in the drawing.

Impregnating solutions for the sheet 12 other than sodium silicate, or other than a water-soluble material, may be used—the only requisites being that the material used for impregnating the sheets 10 and 12 shall not be soluble in a mutual solvent and that the impregnating material for the sheet 12 shall be capable of adhering to the mold and to the sheet 10 with relatively greater tenacity than the tension effected on the outer sheet 10 by evaporation of the solvents therefrom.

Before the impregnating solution in the sheet 12 has set, I apply the lamina 10 impregnated as before described. Thus, the impregnated sheet 12 adheres firmly both to the mold surface 7 and to the sheet 10 with a tenacity sufficiently great to prevent the sheet 10 from pulling away as it is placed under tension due to evaporation of the volatiles therefrom.

After the sheet 10 has sufficiently cured to be removed from the mold, I project a solvent medium, such as water or steam, through the holes 6 in the mold, which passes also along the channels 8, and thus comes in contact with the sodium silicate impregnated sheet 12. This solvent causes the sodium silicate to become sufficiently softened to permit the sheet 12 to be stripped from the mold, as well as from the sheet 10, without injury to the latter.

In some cases it may be desirable to add a suitable detergent, such as Aerosol OT, to the water or steam solvent to render it more penetrating or wetting in its action on the sheet 12.

I claim:

1. In combination, a mold presenting a surface adapted to form a plastic article, means for releasing the article from the mold surface comprising a fabric strip interposed therebetween and impregnated with an adhesive capable of adhering to both said mold surface and the article and being soluble in a solvent which will not dissolve the article, and a solvent-passing opening in the mold communicating with the strip.

2. In combination, a mold presenting a surface for forming a plastic article, and means for retaining the article in conformance with the surface including a layer of plastic material bonded to said surface and capable of being bonded to the article, said layer being soluble in a solvent which will not dissolve the article, a transverse solvent-passing opening through the mold and a channel in the mold surface communicating with the opening.

3. The method of forming on a reversely curved mold surface a plastic article composed of a fabric sheet impregnated with a volatile plastic solution capable of contracting the fabric as its volatiles evaporate therefrom, which method consists of interposing between the mold surface and article a fabric strip impregnated with an adhesive plastic which is soluble in a solvent which will not dissolve the article and which is capable of bonding to the mold and article with an adhesive force greater than the contracting force exerted on the sheet by evaporation of the volatiles therefrom.

4. In combination, a mold presenting a reversely curved surface adapted to form a curved plastic article to be cured thereon, a fabric strip impregnated with a plastic soluble in a solvent which will not dissolve the article, said plastic binding the strip to said surface and being capable of adhering to the article and said plastic being of a type which is capable of adhering to both the mold surface and the article with an adhesive force greater than the contracting force exerted on the article by curing, and a solvent-passing opening in the mold communicating with the strip.

ZACHARY T. WALTER.